(12) United States Patent
Kallabis

(10) Patent No.: US 7,685,723 B2
(45) Date of Patent: Mar. 30, 2010

(54) MEASURING DEVICE

(75) Inventor: Gabriel Kallabis, Spirkelbach (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 5 days.

(21) Appl. No.: 11/962,223

(22) Filed: Dec. 21, 2007

(65) Prior Publication Data

US 2008/0155842 A1 Jul. 3, 2008

(30) Foreign Application Priority Data

Dec. 29, 2006 (DE) .................. 20 2006 019 739 U
Feb. 7, 2007 (DE) .................. 20 2007 001 753 U

(51) Int. Cl.
*G01C 15/02* (2006.01)

(52) U.S. Cl. .................... 33/286; 33/DIG. 21

(58) Field of Classification Search .......... 33/227, 33/281–286, 291, DIG. 21; 362/109, 119, 362/190, 191, 197; 372/107; 200/56 R, 200/60

See application file for complete search history.

(56) References Cited

U.S. PATENT DOCUMENTS 2,762,907 A * 9/1956 Schwartz .............. 362/201
5,610,711 A * 3/1997 Rando .................. 356/247
6,351,890 B1 * 3/2002 Williams ............... 33/286
6,754,969 B2 6/2004 Waibel
6,761,467 B2 * 7/2004 Matthews et al. ........ 362/202
7,099,000 B2 * 8/2006 Connolly ............... 356/139.1
7,134,211 B2 * 11/2006 Bascom et al. ........... 33/286
7,352,944 B2 * 4/2008 Yang .................... 385/134
7,478,917 B2 * 1/2009 Yu ....................... 362/188
7,536,801 B2 * 5/2009 Zhang .................. 33/451
2003/0014872 A1 1/2003 Chen

FOREIGN PATENT DOCUMENTS

DE 442774 1/1968
EP 1376055 1/2004

* cited by examiner

Primary Examiner—Amy Cohen Johnson
(74) Attorney, Agent, or Firm—Dennison, Schultz & MacDonald

(57) ABSTRACT

A laser device with a housing which features a beam outlet window (24), particularly a laser device with an electro-optical mechanism for generating a horizontal and/or vertical light beam, where the housing is at least partially enclosed by a protective covering (10). In order to provide secure protection for the beam outlet window without significantly altering the outer dimensions of the housing when the device is not in use, it is proposed that the protective covering (10) be pivotable about an axis that passes through the housing, and that it feature a first section which, depending on the pivot position of the protective covering, covers or exposes the beam outlet window (24).

22 Claims, 2 Drawing Sheets

MEASURING DEVICE

BACKGROUND OF THE INVENTION

The invention pertains to a measuring device with a housing, which has a beam outlet window, particularly a laser device with an electro-optical mechanism for generating a horizontal and/or vertical light beam, where the housing is at least partially enclosed by a protective covering.

Such a measuring device in the form of a construction laser device is known from EP-B-1 376 055 (DE-U-202 09 856). The laser housing is enclosed by a frame-like receptacle, to which the laser device can be adjusted. This has the advantage that the device is particularly protected, while at the same time the housing, and therefore the laser level, can be adjusted as desired with structurally simple measures. The receptacle, which is to be designated a protective covering, is at least partially separated from the device housing.

According to EP-B-1 298 413, in order to be able to position a self-leveling construction laser on a surface in relation to a marker, the housing is enclosed by plate-like supports that pass through the opposing sides of the laser device off-center. Regardless of the position of the supports, the beam outlet window is always uncovered.

CH-C-442 774 relates to an automatic construction leveling device, the housing of which has beam outlet windows that are associated with mirrors which close off the openings if necessary in order to protect them.

For marking positions on a building, US-A-2003/0014872 provides a projection beam with optics that is disposed inside a collapsible housing.

SUMMARY OF THE INVENTION

The objective of the present invention is to develop a measuring device of the initially described type in such a manner that, without a significant change to the outer dimensions of the housing itself, protection for the beam outlet window is ensured when the device is not in use. If necessary, it must be possible to secure the device within a vertical or approximately vertical limit.

In order to achieve this objective, the invention primarily provides that the protective covering be pivotable about an axis that passes through the housing and features a first section, which, depending on the pivot position of the protective covering, covers or exposes the beam outlet window. The protective covering, particularly along its longitudinal section, features an L-shaped geometry with longitudinal and cross arms, where the cross arm is the first section that accordingly covers or exposes the beam outlet window. It is alternatively possible that the protective covering has a U-shaped geometry with cross and lateral arms, where the ends of the lateral arms are pivotably connected to the housing and the cross arm is the first section.

The present invention proposes that the protective covering originate directly from the housing and be adjustable to the same, that the protective covering have a full-surface contact with at least two adjoining outer surfaces when the measuring device is not in use, particularly in transport position, whereby at the same time the beam outlet window is covered.

The protective covering is therefore adjusted to the outer geometry of the housing in such a manner that it serves as pivotable walls and/or wall sections of the housing.

With the L-shaped geometry of the protective covering, it is ensured that the end of the longitudinal arm distant from the cross arm is pivotably connected to the housing. The longitudinal arm itself may feature receptacles, such as through-holes, as mounting fasteners. The measuring device can therefore, when the protective covering is pivoted away, for instance, be suspended from a wall in order to project vertical and/or horizontal light beams, or spots, if it is a laser device.

The U-shaped geometry of the protective covering particularly ensures that the pivot axis passes through the center of two opposing sides, particularly the bottom and top surface of the housing and that the cross arm of the protective covering may be directed to opposing sides, particularly the front areas of the housing, in order to cover these if necessary. The cross arm can furthermore have mounting fasteners, which can be used to suspend the device from a wall, for example.

Separately from this, the protective covering should be designed in such a manner that when it is in a position covering the beam outlet window, it can be snap-locked with the housing. This would prevent uncontrolled pivoting of the protective covering. The present invention particularly pertains to a measuring device with a block housing, where the beam outlet window is provided in a transverse side area, particularly a front area.

In order to allow the protective covering to pivot with structurally simple methods, a development of the present invention provides that the axis extend across, particularly vertically, in relation to a horizontal light beam which is to be produced, where a sleeve body or two sleeve bodies, which are positioned flush with one another, can be provided inside the housing, around which the protective covering can be pivoted.

The protective covering consists particularly of high-impact plastic so that the housing can be made from inexpensive material. For this purpose, it is intended that the protective covering, in position covering the beam outlet window, partially extends past the housing so that in the event of an impact, such as during a fall, the protective covering is impacted first.

BRIEF DESCRIPTION OF THE DRAWINGS

Additional details, advantages and features of the present invention may be learned not only from the claims and from the features to be inferred from them, alone or in combination, but also from the following description of the preferred embodiments that can be inferred from the illustrations, in which:

DESCRIPTION OF THE PREFERRED EMBODIMENTS

Figure 4:
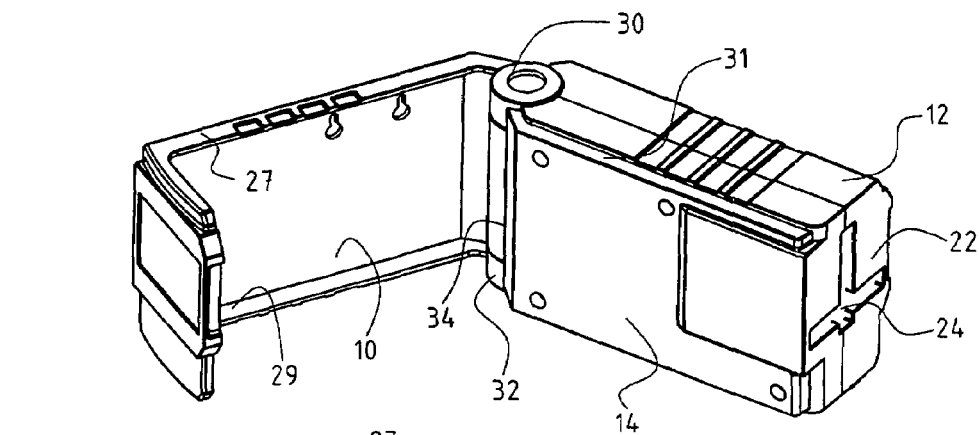
FIG. 4 shows the measuring device according to FIG. 1 with a further opened protective covering.

The teaching in accordance with the invention is described below with reference to a laser device, without creating a restriction on the teaching according to the invention. Rather, it refers rather generally to measuring devices with housings that feature a beam outlet window that can be closed or opened to a desired extent by a protective covering in order to provide protection.

FIGS. 1 through 4 illustrate a first embodiment of a protective covering 10, which is hinge-connected to a housing 12 of a laser device and is pivotable. The housing 12 has a block geometry without creating a restriction.

The housing 12 encloses the longitudinal sides 14 and 16, bottom area 18, top area 20 and face areas 22, of which one is shown, and a beam outlet window 24. The bottom area 18 of the longitudinal side area 14 and the top area 20 can provide additional beam outlet windows.

Preferably positioned in housing 12 is an electro-optical mechanism that is automatically adjustable depending on gravity, by which a vertical and/or horizontal light beam can be generated to project a vertical and/or horizontal light line.

The protective covering 10 has an L-geometry with longitudinal arms 26 and cross arms 28. The protective covering 10 is pivotably mounted in the area of the front wall, which is opposite the light beam outlet window 24. Additionally, the bottom and top walls and therefore the bottom and top areas 18, are passed through by a pivot axis. In order to hinge the protective covering 10, it features at the end section of its longitudinal arm 26 sleeve-like receptacles 30, 32, which can be mounted on conical sections of a cylindrical body 34 extending from the housing 12. This makes it possible to easily pivot the protective covering 10.

Figure 3:
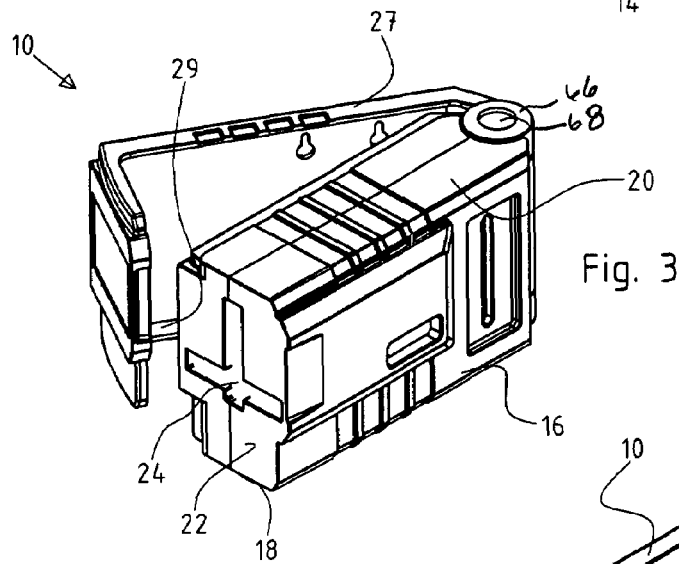
FIG. 3 shows the measuring device according to FIG. 1 with a partially opened protective covering in an illustration that is different from FIG. 2.
Figure 1:
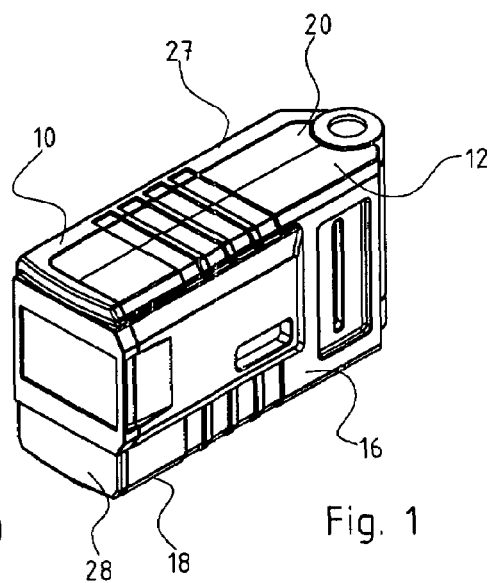
FIG. 1 is a perspective illustration of a first embodiment of a protective covering for a measuring device.
Figure 2:
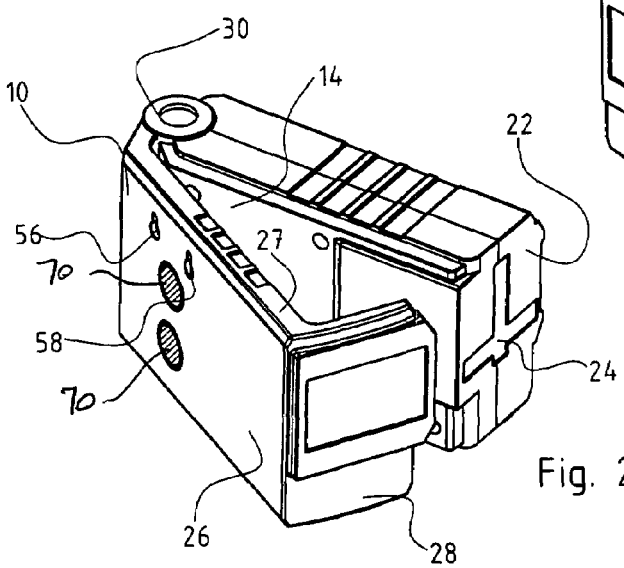
FIG. 2 shows the measuring device according to FIG. 1 with a partially opened protective covering.

As shown particularly in a comparison of FIG. 1 with FIG. 2 through 4, the protective covering 10 is geometrically fitted to the contour of the front area 22 as well as to the longitudinal side area 14 in such a manner that when the beam outlet window 24 is covered, thus with an almost-closed housing 12, the protective covering 10 rests on the side area 14 as well as the front area 22 and aligns with the adjoining walls and therefore with the top and bottom area 18, 20 as well as the forward side area 16. Additionally, the protective covering 10 can be locked in position covering the beam outlet window 24 (FIG. 1) with the housing 12.

The illustrations of FIGS. 1, 2 and 4 furthermore show that at least the longitudinal arm 26 of the protective covering 10 has angled longitudinal edges 27, 29, which in position covering the beam outlet window 24 engage and/or come to rest on one of the steps 31, which run between the back area 14 and the top and/or bottom area 18, 20. This provides a tight connection of the protective covering 10 and the adjoining top and/or bottom area 18, 20 of the housing 12. The longitudinal edges 27, 29 and thus the steps 31, can be partially enlarged to close off, for instance, beam outlet windows in the top and/or bottom areas.

Figure 5:
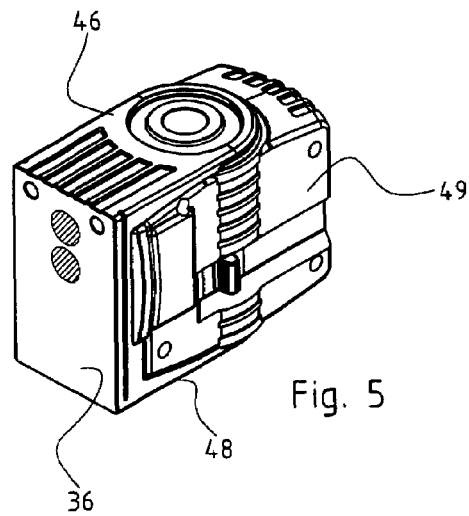
FIG. 5 shows a second embodiment of a protective covering for a measuring device in closed position.
Figure 7:
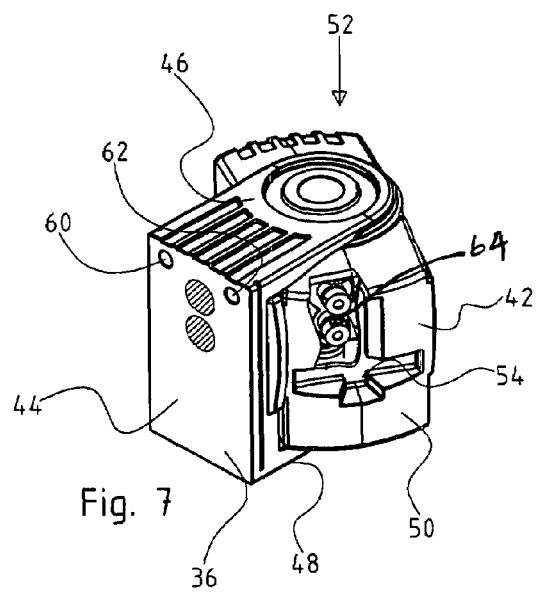
FIG. 7 shows the measuring device according to FIG. 5 in a second position of the protective covering.
Figure 6:
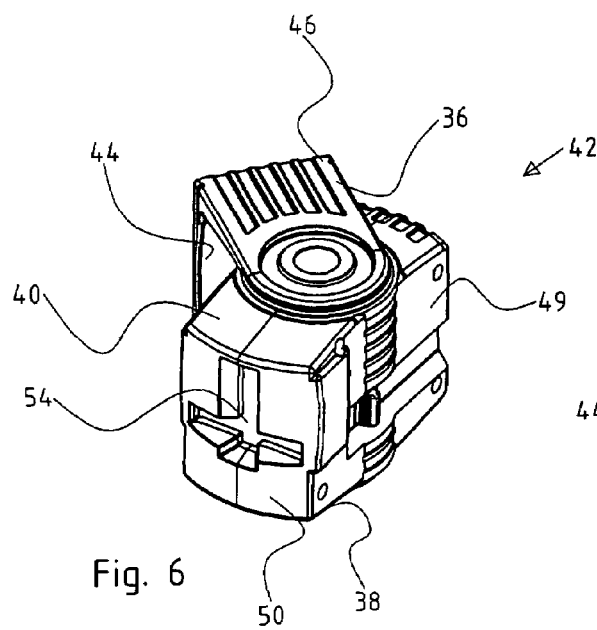
FIG. 6 shows the measuring device according to FIG. 5 in a first position of the protective covering.

If the pivot axis of the protective covering 10 runs eccentrically in the housing 12, particularly in the marginal area of housing 12 along the front area that is opposite the beam outlet window 24, then the exemplary embodiment shown in FIG. 5 through 7 provides for a protective covering 36 whose pivot axis passes through the top and/or bottom area 38, 40 of a housing 42 at its center. The protective covering 36 then features a U-geometry with cross arms 44 and side arms 46, 48, which feature a longitudinal extension such that the cross arm 44 optionally covers one of the front areas 50, 52 of the housing 42. In this exemplary embodiment, the visible front area 50 features a beam outlet window 54. In the cutaway portion, there is shown an electro-optical mechanism 64 for generating a horizontal and/or vertical light beam.

According to the embodiment of FIGS. 1 through 4, the pivot axis of the protective covering 36 therefore passes through the bottom and top walls 38, 40 and the bottom and top areas, and when the housing 42 is properly aligned, vertically to the generated horizontal beam of the laser.

As in the embodiment of FIGS. 1 through 4, the protective covering 36 is designed geometrically in such a manner that when the front areas 50, 52 are closed off, the protective covering 36 aligns with the adjoining areas and therefore with the side areas 49. The side arms 46, 48, which are pivotably attached to the housing 42, feature at their ends circular attachments, which have the function of a bearing eye 66 retaining a bearing support 68, for the plate-like sections of the housing 42 to ensure rotation.

The illustrations, particularly of FIGS. 2 and 5, furthermore show that the protective covering 10, 36 has throughholes, of which a few have been marked as an example with the reference numerals 56, 58, 60, 62, to allow, for example, attachment to a vertical boundary area such as a wall. This represents a mounting fastener. Magnets 70 can likewise be inserted into the protective covering.

Connecting threads can be provided in the bottom side arm 48 to attach the device to a camera tripod, for example.

Figure 8:
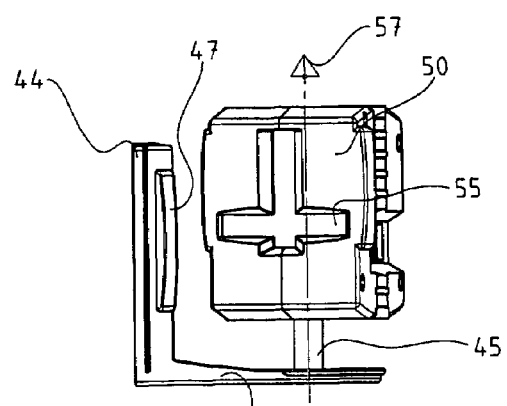
FIG. 8 shows a further embodiment of a protective covering for a measuring device.

A development according to FIG. 8 proposes that the protective covering 36 has an L-shaped geometry. This is formed by the arms 46, 48 according to FIGS. 5-7. The arm 48 therefore extends along the bottom area 38 of the housing 42 and the other arm 44 may be aligned with the front area 50 of the beam outlet window 54. The protective covering 36 can now pivot about an axis that is, for example, formed as a bolt 45, which is displaceable and extends into the housing 42. The housing 42 is therefore height adjustable in relation to the bolt 45 as well as relative to the protective covering 36.

Further, FIG. 8 shows that a preferably springy element 47 extends from an interior area of one of the arms 44, 48 so that the protective covering 36 locks into position when the beam outlet window 54 is closed, i.e. in a recess that is in the area of the beam outlet window 54. Such a structural option applies to all embodiments.

What is claimed is:

1. Laser measuring device comprising:
   a housing having a block form and a beam outlet window in a wall of the housing, and disposed in the housing an electro-optical mechanism for generating a horizontal and/or vertical laser light beam, and
   a protective covering at least partially enclosing the housing, the protective covering being pivotable about an axis that passes through the housing and having a first section which selectively covers completely or exposes the beam outlet window, as the protective covering pivots about the axis,
   wherein the protective covering comprises at least one arm having at least one receptacle which serves as a mounting fastener.

2. Measuring device according to claim 1, wherein the protective covering has an L-shaped geometry comprising a longitudinal arm and a cross arm, the cross arm constituting the first section.

3. Measuring device according to claim 2, wherein an end section of the longitudinal arm distant from the cross arm is pivotably connected to the housing.

4. Measuring device according to claim 2, wherein the protective covering is pivotable to a position closing the beam outlet window in which the protective covering covers a longitudinal wall of the housing and an adjoining transverse wall in which the beam outlet window is located.

5. Measuring device according to claim 2, wherein at least one of the longitudinal arm and the cross arm of the protective covering has angled longitudinal edges, which when the protective covering is pivoted to a position covering the beam outlet window, are seated against a step which runs between a longitudinal wall of the housing and a top and/or bottom area of the housing.

6. Measuring device according to claim 2, wherein at least one of the longitudinal arm and the cross arm of the protective covering has angled longitudinal edges which run at least partially along top and/or bottom area of the housing to close off the beam outlet window.

7. Measuring device according to claim 2, wherein a spring element extends from an interior area of an arm of the protective covering which snap-locks with a recess of the housing, when the protective covering is in a position closing the beam outlet window.

8. Measuring device according to claim 1, wherein the protective covering is pivotable to a position closing the beam outlet window in which the protective covering aligns with adjoining outer areas of the housing.

9. Measuring device according to claim 1, wherein the protective covering has a U-shaped geometry with a cross arm constituting the first section, and a pair of lateral arms having ends which are pivotably connected to the housing.

10. Measuring device according to claim 9, wherein the axis about which the protective covering is pivotable passes through the center of top surface of the housing, and that the cross arm may be aligned with areas which are vertical to side areas of the housing.

11. Measuring device according to claim 9, wherein outer edges of the cross arm and the lateral arms are aligned with adjoining sides of the housing, when the protective covering is pivoted to a position closing the beam outlet window.

12. Measuring device according to claim 9, wherein the beam outlet window is located in a transverse area of the housing.

13. Measuring device according to claim 9, wherein a connecting thread is provided in a lower side arm of the protective covering.

14. Measuring device according to claim 1, wherein the at least one mounting fastener is a wall attachment.

15. Measuring device according to claim 1, additionally comprising a device for snap-locking the protective covering to the housing, when the protective covering is pivoted to a position closing the beam outlet window.

16. Measuring device according to claim 1, wherein the axis runs transversely in relation to a beam that is generated by the electro-optical mechanism.

17. Measuring device according to claim 1, additionally comprising bearing eyes extending from the protective covering that engage bearing supports that originate from the housing.

18. Measuring device according to claim 1, wherein in the position covering the beam outlet window, the at least one arm of the protective covering runs along outer areas of the housing and at least partially comes to rest thereon.

19. Measuring device according to claim 1, wherein the protective covering substantially comprises sections, which in a position covering the beam outlet window run along the outer areas and at least partially come to rest thereon.

20. Measuring device according to claim 1, wherein in a position covering the beam outlet window, the protective covering is aligned with areas that adjoin the protective covering on the housing.

21. Measuring device according to claim 1, additionally comprising at least one magnet inserted in the protective covering.

22. Measuring device according to claim 1, wherein the protective covering comprises an L-shaped geometry with a first arm that runs along a bottom wall of the housing and a second arm that runs along or is aligned with a front area of the housing, and wherein the protective covering has an axis which is formed as a bolt element, which serves to adjust the distance between the housing and the protective covering.

\* \* \* \* \*